United States Patent [19]
Van Den Berg

[11] Patent Number: 6,072,312
[45] Date of Patent: Jun. 6, 2000

[54] ENCAPSULATED TRANSDUCER HAVING A PROTECTIVE SLEEVE

[75] Inventor: Dave Van Den Berg, Minden, Nev.

[73] Assignee: Bently Nevada Corporation, Minden, Nev.

[21] Appl. No.: 08/967,088

[22] Filed: Nov. 10, 1997

Related U.S. Application Data

[62] Division of application No. 08/542,522, Oct. 13, 1995, Pat. No. 5,685,884.

[51] Int. Cl.[7] .............................. G01R 3/00; H01F 41/02; G01P 1/02; G01B 7/30
[52] U.S. Cl. ............................. 324/207.16; 324/207.25; 29/595; 29/856; 264/272.16
[58] Field of Search ..................... 324/207.15, 207.16, 324/207.24, 207.25, 234, 236, 262; 174/52.2, 52.3; 29/595, 602.1, 606, 855, 856; 264/272.11, 272.15, 272.16

[56] References Cited

U.S. PATENT DOCUMENTS

| | | | |
|---|---|---|---|
| 2,361,348 | 10/1944 | Dickson et al. | 18/30 |
| 2,890,505 | 6/1959 | Brand | 22/151 |
| 3,932,828 | 1/1976 | Plunkett et al. | 336/96 |
| 4,000,877 | 1/1977 | Shead et al. | 249/82 |
| 4,162,138 | 7/1979 | Byrne | 425/125 |
| 4,377,548 | 3/1983 | Pierpont | 264/265 |
| 4,408,159 | 10/1983 | Prox | 324/207 |
| 4,419,646 | 12/1983 | Hermle | 336/90 |
| 4,470,786 | 9/1984 | Sano et al. | 425/125 |
| 4,680,543 | 7/1987 | Kohen | 324/208 |

(List continued on next page.)

FOREIGN PATENT DOCUMENTS

| | | |
|---|---|---|
| 2576245 | 7/1986 | France . |
| 3064279 | 6/1978 | Japan . |
| 6037130 | 7/1992 | Japan . |
| 1313748 | 4/1973 | United Kingdom . |
| 1353603 | 5/1974 | United Kingdom . |
| 8403794 | 9/1984 | WIPO . |

*Primary Examiner*—Walter E. Snow
*Attorney, Agent, or Firm*—Dennis DeBoo

[57] ABSTRACT

An encapsulated transducer (10) includes an injection molded encapsulation (20) having a front end (22) and a back end (24). The encapsulation (20) is a monolith of cured moldable material ensconcing a sensing element (90) proximate the front end (22) and a portion of an information transmitting medium (120) emanating from the back end (24). A component alignment preform (40) operatively couples the sensing element (90) with the information transmitting medium or cable (120). The component alignment preform (40) includes a front ferrule (70) and a rear ferrule (80) bonded thereto and linearly spaced apart along a long axis "A". The component alignment preform (40) further includes an annular recess (44) in which the sensing element or coil (90) is placed so that it is linearly spaced and aligned along the common long axis "A" in which the front and rear ferrules (70), (80) are aligned. A first lead (98) of the coil is electrically connected to the front ferrule (70) and a second lead (100) of the coil (90) is electrically connected to the rear ferrule (80). A back end (48) of the component alignment preform (40) receives a stripped end (122) of the cable (120) such that a center conductor (126) mates with the front ferrule (70) and a coaxial conductor (130) mates with the rear ferrule (80). The respective conductors (126), (130) are electrically and mechanically connected to the pair of front and rear ferrules (70), (80). A protective sleeve (150) is then fitted over the coil (90) thereby forming a sleeved coil and cable assembly (170). This sleeved coil and cable assembly (170) is encapsulated by an injection molding process which provides the durable encapsulation (20) which bonds with itself and with the sleeved coil and cable assembly (170). The sleeved coil and cable assembly (170) is symmetrically disposed within the encapsulation (20) and the encapsulation (20) includes an integrally formed protective wall having an uniform thickness "T" along a forwardmost portion of the sensing element (90).

21 Claims, 8 Drawing Sheets

U.S. PATENT DOCUMENTS

| | | | |
|---|---|---|---|
| 4,829,245 | 5/1989 | Echasseriau et al. | 324/174 |
| 4,954,307 | 9/1990 | Yokoyama | 264/272.15 |
| 4,959,000 | 9/1990 | Giza | 425/116 |
| 5,016,343 | 5/1991 | Schutts | 29/605 |
| 5,018,049 | 5/1991 | Mehnert | 361/380 |
| 5,021,737 | 6/1991 | Schutts | 324/207.11 |
| 5,039,942 | 8/1991 | Buchschmid et al. | 324/174 |
| 5,049,055 | 9/1991 | Yokoyama | 425/116 |
| 5,122,046 | 6/1992 | Lavallee et al. | 425/116 |
| 5,133,921 | 7/1992 | Yokoyama | 264/272.15 |
| 5,138,292 | 8/1992 | Forster | 335/278 |
| 5,147,657 | 9/1992 | Giza | 425/117 |
| 5,151,277 | 9/1992 | Bernardon et al. | 425/112 |
| 5,182,032 | 1/1993 | Dickie et al. | 249/91 |
| 5,226,221 | 7/1993 | Kilgore | 29/605 |
| 5,240,397 | 8/1993 | Fay et al. | 425/145 |
| 5,252,051 | 10/1993 | Miyamoto et al. | 425/116 |
| 5,351,388 | 10/1994 | Van Den Berg et al. | 29/602.1 |
| 5,376,325 | 12/1994 | Omson | 264/254 |

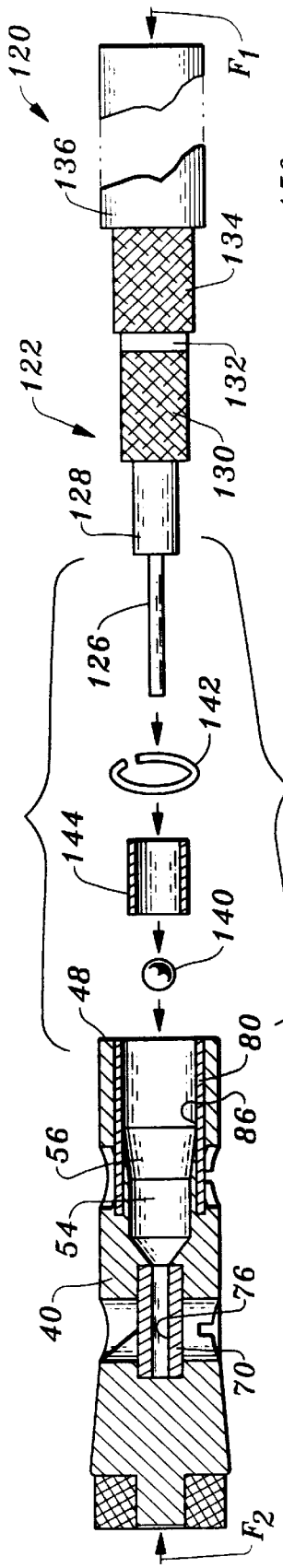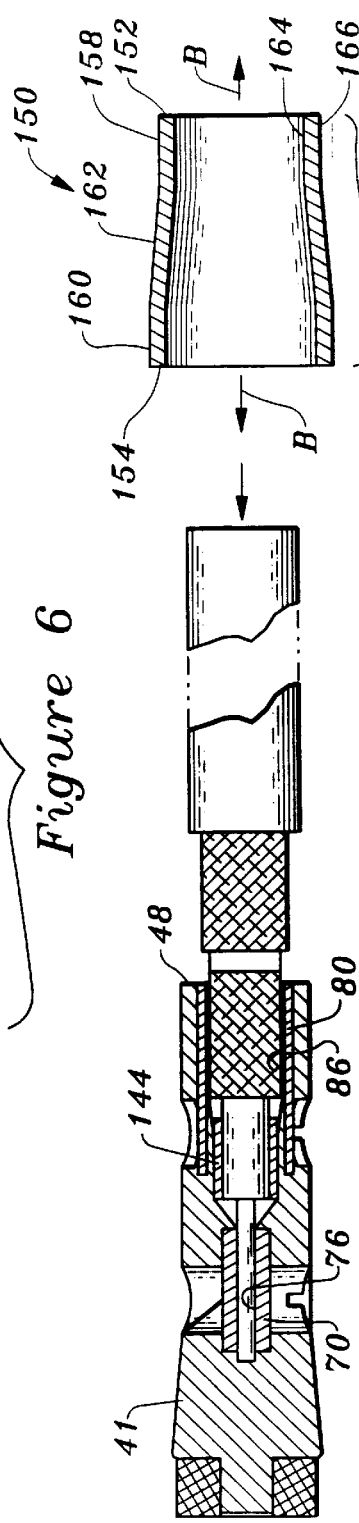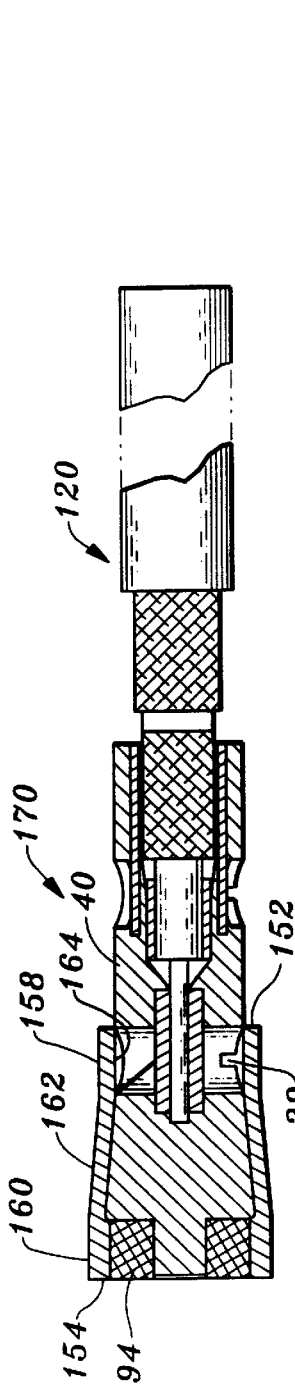
Figure 6
Figure 7
Figure 8

ENCAPSULATED TRANSDUCER HAVING A PROTECTIVE SLEEVE

This application is a division of application Ser. No. 08/542,522, filed Oct. 13, 1995, now U.S. Pat. No. 5,685,584.

FIELD OF THE INVENTION

The present invention relates generally to an encapsulated transducer with a component alignment preform and, in particular, to an encapsulated transducer substantially impervious to adverse mechanical, physical or chemical aggressions from the surrounding environment and method of manufacturing such transducer which is used to monitor vibration of rotating machinery, temperature sensing and the monitoring and sensing of other physical phenomenon.

BACKGROUND OF THE INVENTION

Monitoring and diagnosing the status of rotating and reciprocating machinery start with accurate and dependable measurements from a transducer and its associated electronics and then proceed to other sophisticated analyzing apparatus for reduction and display. One such transducer is a proximity transducer which may be utilized for, inter alia, monitoring the vibration characteristics of a rotating shaft of a machine. In this environment, the transducer must operate under very adverse physical, chemical and mechanical conditions and it is often very difficult to replace such transducers. Thus, there is an ongoing effort to make the proximity transducer one of the most reliable parts of the monitoring system.

Typically, the proximity transducer, in conjunction with associated electronics, outputs a signal correlative to the spacing between an object or "target" (the rotating shaft of the machine) and a sensing coil of the proximity transducer. It is critical that the length or spacing between the target and the sensing coil of the proximity transducer remains within the linear range of the transducer for providing accurate and reliable measurements when in operation. Thus, the hallmark for providing accurate and reliable measurements relies on providing a transducer which is impervious to the predations of the environment and which does not consume an inordinate amount of the linear range of the transducer.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

U.S. PATENT DOCUMENTS

| DOCUMENT NO. | DATE | NAME |
| --- | --- | --- |
| 2,361,348 | October 24, 1944 | Dickson et al. |
| 2,890,505 | June 16, 1959 | Brand |
| 3,932,828 | January 13, 1976 | Plunkett et al. |
| 4,000,877 | January 4, 1977 | Shead et al. |
| 4,162,138 | July 24, 1979 | Byrne |
| 4,377,548 | March 22, 1983 | Pierpont |
| 4,408,159 | October 4, 1983 | Prox |
| 4,419,646 | December 6, 1983 | Hermle |
| 4,470,786 | September 11, 1984 | Sano et al. |
| 4,680,543 | July 14, 1987 | Kohen |
| 4,829,245 | May 9, 1989 | Echasseriau et al. |
| 4,954,307 | September 4, 1990 | Yokoyama |
| 4,959,000 | September 25, 1990 | Giza |
| 5,016,343 | May 21, 1991 | Schutts |
| 5,018,049 | May 21, 1991 | Mehnert |
| 5,021,737 | June 4, 1991 | Schutts |
| 5,039,942 | August 13, 1991 | Buchschmid, et al. |
| 5,049,055 | September 17, 1991 | Yokoyama |
| 5,122,046 | June 16, 1992 | Lavallee et al. |
| 5,133,921 | July 28, 1992 | Yokoyama |
| 5,138,292 | August 11, 1992 | Forster |
| 5,147,657 | September 15, 1992 | Giza |
| 5,151,277 | September 29, 1992 | Bernardon, et al. |
| 5,182,032 | January 26, 1993 | Dickie et al. |
| 5,226,221 | July 13, 1993 | Kilgore |
| 5,240,397 | August 31, 1993 | Fay et al. |
| 5,252,051 | October 12, 1993 | Miyamoto et al. |
| 5,351,388 | October 4, 1994 | Van Den Berg, et al. |
| 5,376,325 | December 27, 1994 | Ormson |

FOREIGN PATENT DOCUMENTS

| DOCUMENT NO. | DATE | COUNTRY |
| --- | --- | --- |
| UK 1 313 748 | April 18, 1973 | Great Britain |
| UK 1 353 603 | May 22, 1974 | Great Britain |
| JA-139710 | August 6, 1978 | Japan |
| WO 84/03794 | September 27, 1984 | PCT |
| FR 2576-245-A | July 25, 1986 | France |
| JA 6-37130-A | October 2, 1994 | Japan |

The two patents to Schutts and the patent to Van Den Berg, et al. reflect assignee's ongoing commitment to providing an accurate sensor which is impervious to predations of the environment.

The French patent to Jaeger teaches the use of a method and apparatus for injection molding of an elongated detector with a sensor at one end. One end of the detector is supported by the mold while the sensor end is engaged by a centering sleeve (130). The centering sleeve (130) terminates in a piston (132) which is mobile in a cylinder (126) and slides about a fixed rod (138). Thermoplastic is injected into the mold and the centering sleeve is removed from the sensor when the injection process is only partially complete.

The Japanese patent to Kawakami teaches the use of sealing a semiconductor chip by transfer molding. A semiconductor chip (4) is mounted on a carrier (1) and is held at a fixed position via mobile pins (17) and (18). The mobile pins (17) and (18) are movably fitted to a top force (11) and a bottom force (12) for freely advancing or retracting the pins into and out of the cavities (15) and (16). While the pins (17) and (18) are in contact with the carrier (1), a resin (20) is injected into the cavities (15) and (16) through gates (13) and (14) and the pins (17) and (18) are gradually retracted in accordance with the injecting state of resin (20).

The patent to Yokoyama teaches the use of an apparatus for manufacturing plastic encapsulated electronic semiconductor devices. A support pad (11) is firmly fixed by first and second sliders (24A) and (24B) and also by mold halves (19) and (20). The first and second sliders (24A) and (24B) are moved outwardly of a cavity (25) when the cavity is half filled with the plastic encapsulating material. Spaces, which are formed after movement of the sliders, are filled with the plastic encapsulating material directly poured through a gate (23). It should be noted that the sliders (24A), (24B) perform two functions in the cavity (25). The first function is to firmly grasp a thin end portion of the support pad (11) thereby fixing same in position and the second function is to narrow a passage through the gate (23).

The patent to Pierpont teaches the use of a method for encapsulating an electrical component having radial leads. A large multi-cavity mold is loaded with a plurality of horizontal radially leaded capacitors. The closed mold grips the leads (15). A top pin (25) pushes each component body downward a predetermined degree so that each body is left in about the same position within the corresponding mold cavity. A bottom pin (28) then pushes each component body upwardly only slightly above a center of the mold cavity so that upon bottom pin withdrawal, stresses within the lead wires of the electrical component cause the component bodies to spring back just to the mold cavity center portion. Molding resin is then introduced.

The other prior art listed above, but not specifically discussed, teach other sensor devices and molding processes and further catalog, the prior art of which the applicant is aware. These references diverge even more starkly from the references specifically distinguished above.

SUMMARY OF THE INVENTION

The present invention is distinguished over the known prior art in a multiplicity of ways. For one thing, the present invention provides a transducer including a protective seamless encapsulation ensconcing a sensing element at one end and a cable extending out of the other end. In addition, the sensing element is symmetrically disposed about a long axis of the transducer and the seamless encapsulation includes an integrally formed protective wall having an uniform thickness along a forwardmost portion of the sensing element.

Preferably, the sensing element is in the form of a sensing coil having a front face, a back face, a body having an outer surface and a center void extending through the body and at least a first lead and a second lead extending from the sensing coil and spaced from one another. The body of the coil extends between the front face and the rear face. The cable is preferably a triaxial cable comprised of an outer protective jacket circumscribing an interior of the cable which includes three concentrically disposed conductors separated from one another by at least two concentrically disposed insulators. Specifically, the outer protective jacket circumscribes the concentrically disposed triaxial, coaxial and center conductors which are in turn separated from one another by an insulator and a dielectric interposed between the triaxial and coaxial conductors and the coaxial and center conductors, respectively. At least one end of the cable is stripped in a step-like fashion to expose a length of the center conductor, the dielectric, the coaxial conductor, the insulator and the triaxial conductor.

In addition, the encapsulated transducer includes a front ferrule having a bore with an inner diameter substantially equal to the outer diameter of the center conductor and a rear ferrule having a bore with an inner diameter substantially equal of the outer diameter of the coaxial conductor.

A component alignment preform is molded in a single step. The component alignment preform includes an annular recess having a center post axially aligned with the front and rear ferrules which are bonded to the preform and linearly spaced apart along a long axis of the preform.

Once the preform has been molded, the sensing coil is placed over the center post and in the annular recess. The sensing coil is then electrically connected to the ferrules. This is accomplished by resistance welding the first lead of the sensing coil to the front ferrule and the second lead of the sensing coil to the rear ferrule.

Then, the stripped end of the cable is inserted into the bores of the molded together front and rear ferrules. The center conductor is mechanically and electrically connected to the front ferrule and the coaxial conductor is mechanically and electrically connected to the rear ferrule thereby forming a sensing coil and cable assembly. A protective sleeve is fixed over the sensing coil, thus forming a sleeved coil and cable assembly.

Once the process of forming the sleeved coil and cable assembly is completed, the sleeved coil and cable assembly is ready to be encapsulated using an injection molding process. The injection mold is defined by an upper mold plate having an upper cavity and a lower mold plate having a lower cavity. The upper and lower cavities form a mold cavity when in the closed position which is complementary to the desired form of the encapsulation of the sleeved coil and cable assembly. The mold cavity is defined by an upper wall, a lower wall, a front wall and a back wall having an opening extending therethrough. Preferably, the upper mold plate and the lower mold plate are each provided with at least one slideable support pin which extends into the respective upper or lower cavity of the mold and when retracted conform with the respective upper or lower wall of the mold cavity to provide the desired form of the encapsulation. In addition, a slideable locator pin is provided adjacent the front wall of the mold cavity and is capable of extending into and out of the lower cavity when the mold is in an opened position.

The sleeved coil and cable assembly is placed into the lower cavity of the lower mold plate such that the cable of the sleeved coil and cable assembly extends out the opening of the back wall of the mold cavity. At least one slideable support pin is extended into the lower cavity of the lower mold plate and is placed in engagement with a portion of the sleeved coil and cable assembly therein. This supports and centers the sleeved coil and cable assembly within the mold cavity. In addition, the slideable locator pin is extended into the mold cavity such that it properly locates the sensing coil within the mold cavity and spaces it a predetermined distance from the front wall of the mold cavity. Once the slideable locator pin has centered the coil and spaced it a predetermined distance from the front wall of the mold cavity, it is withdrawn and the injection mold is closed. The slideable support pin in the upper mold plate is extended into the upper cavity and comes into engagement with a portion of the sleeved coil and cable assembly when the injection mold is closed. This provides additional means for supporting and centering the assembly within the mold cavity such that there is a void completely surrounding the assembly (except of course where the pins are touching the assembly). Note that the location and the number of slideable support pins may be configured to best support the assembly being encapsulated within the cavity.

Once the mold is in the closed position a self-bonding moldable material is injected into the mold cavity via runners and gates. This process is continued until the mold cavity is completely filled and the coil and cable assembly is completely ensconced within the moldable material. The slideable support pins are then retracted within the respective upper and lower walls of the mold cavity prior to the moldable material solidifying. Note that an additional charge of moldable material may be injected into the mold as the support pins are being withdrawn so as to accommodate for any additional material needed to completely fill the voids left by the previously extended support pins. Once the process of injecting the moldable material into the cavity is completed and the support pins have been retracted, the mold may be opened and the encapsulated transducer allowed to cool in the lower mold plate. Once the encapsulated transducer is cooled one or more bottom support pins may be actuated to eject the encapsulated transducer therefrom. Preferably the moldable material is polyphenylene sulfide (PPS) which has the characteristic of bonding to itself.

OBJECTS OF THE INVENTION

It is a general object of the present invention to provide an improved transducer and a method of manufacturing such transducer.

A primary object of the present invention is to provide an improved encapsulated transducers with a component alignment preform and method of manufacturing same.

A further object of the present invention is to provide an encapsulated transducer as characterized above which has an injection molded seamless encapsulation ensconcing a sensing coil at one end and a cable extending out of the other end, one end of the cable being electrically connected to the sensing coil within the encapsulation and the other end connected to an electrical processing unit distal from said encapsulation.

Another further object of the present invention is to provide an encapsulated transducer as characterized above wherein the encapsulation provides a seamless sealing envelope around the sensing coil and an end portion of the cable, thus providing an impervious seal against any mechanical, physical or chemical aggressions from the surrounding medium.

Another further object of the present invention is to provide an encapsulated transducer as characterized above which is comparatively less expensive to manufacture than existing transducers for use in monitoring and diagnosing the status of rotating and reciprocating machinery and which also lends itself to rapid mass production techniques.

Another further object of the present invention is to provide a preform which substantially axially aligns the sensing coil with the front and rear ferrules and the respective conductors of the cable.

Another further object of the present invention is to provide an encapsulated transducer as characterized above wherein the sleeved coil and cable assembly is centered within the encapsulation and wherein a distance between the front face of the sensing coil and a front face of the encapsulation is held to a very close tolerance which is reproducible from one transducer to another in mass production.

Another further object of the present invention is to provide an encapsulated transducer as characterized above wherein the encapsulation strongly bonds to the sleeved coil and cable assembly for providing a leak tight seal and resisting axial forces applied to the encapsulation or cable which may cause the electrical connections to completely or partially break resulting in an inoperative or unreliable transducer.

Another further object of the present invention is to provide an encapsulated transducer as characterized above which is capable of being mass produced with reproducible operational characteristics without appreciable alterations of the signals they admit when in operation.

Another further object of the present invention is to maintain a predetermined linear range capability for each manufactured transducer.

Another further object of the present invention is to provide a slideable locator pin which centers the coil within the mold cavity and spaces the front face of the coil from the front wall of the mold cavity prior to the injection molding process.

Another further object of the present invention is to provide a plurality of slideable support pins for supporting and centering the sleeved coil and cable assembly during the injection molding process.

Viewed from a first vantage point it is an object of the present invention to provide an information transmitting sensor and housing comprising: a sensing element; a cable coupled to the sensing element; a component alignment preform operatively coupled to the sensing element and the cable; a protective sleeve extending from the sensing element over the preform and towards the cable; and a monolith of cured moldable material ensconcing the sensing element and a portion of the cable defining a seamless mass circumscribing the sensing element and a portion of the cable.

Viewed from a second vantage point it is an object of the present invention to provide an encapsulated transducer for use in monitoring the status of rotating equipment in a harsh environment with a component alignment preform having a leading end with an active element and a trailing end with an information transmitting medium emanating therefrom, formed by: fixing an abbreviated protective sleeve over the active element and a portion of the component alignment preform; integrally forming a locating means proximate the leading end of the preform; locating the active element in a mold cavity with the locating means coupled thereto, assuring proper registry in the mold cavity; integrally forming a supporting means proximate the component alignment preform; further supporting the active element and the component alignment preform in the mold cavity with the support means and removing the locator means; molding over the active element, the protective sleeve and the preform of the sensor with a moldable material except for an area of support; removing the support means; injecting moldable material adjacent the support means for filling in the areas heretofore occupied by the support means; whereby the active element is precisely located in a moldable material to accurately address the rotating equipment.

Viewed from a third vantage point, it is an object of the present invention to provide a transducer for monitoring the status of rotating equipment wherein a shaft of the rotating equipment is exposed to the transducer, comprising, in combination: means for mounting the transducer a distance from the shaft such that a tangent of the shaft is perpendicular to a long axis of the transducer, the transducer having a sensing coil located proximate the shaft, a front portion of the transducer including a protective wall having uniform thickness along a forwardmost portion of the sensing coil, the sensing coil symmetrically disposed about the long axis, and a protective seamless encapsulation integrally formed with the protective front wall ensconcing the sensing coil and overlapping both a protective sleeve and a leading portion of a cable operatively coupled to the sensing coil, the cable extending away from the transducer to an electrical processing unit.

Viewed from a fourth vantage point, it is an object of the present invention to provide a process for making a transducer, comprising the steps of: providing a sensing coil having a center void, a front face, a rear face and at least a first lead and a second lead extending from the sensing coil; providing a cable having at least one outer conductor surrounding at least one insulator carrying at least one center conductor; connecting the cable to the core; stripping an end of the cable in a step-like fashion to expose a portion of the center conductor, the insulator and the outer conductor; forming a front and rear pair of ferrules with the front ferrule having a bore with a diameter substantially matching the diameter of the center conductor and the rear ferrule having a bore with a diameter substantially matching the diameter of the outer conductor; molding together in linearly spaced proximity with a self-bonding moldable material the front and rear ferrules and providing in such molding step an annular recess near the front ferrule and linearly aligned therewith and a chamber interposed between and in open communication with the front and rear ferrules, thereby forming a component alignment preform; inserting the coil in the annular recess and electrically connecting the first lead to the front ferrule and the second lead to the rear ferrule; inserting the stripped cable end into the bores of the molded together front and rear ferrules and mechanically and electrically connecting the outer conductor to the rear ferrule and the center conductor to the front ferrule, thereby forming a sensing coil and cable assembly; forming an abbreviated sleeve having a first end with a substantially constant cross-sectional area and a second end with a substantially constant cross-sectional area greater than the first end, a body having a substantially smooth outer surface and a hollow inner bore defining an inner surface, the body extending between the first end and the second end; fixing the sleeve over the sensing coil thereby forming a sleeved coil and cable assembly; supporting and centering the sleeved coil and cable assembly within a mold cavity with at least one slideable support; orienting the cable to extend out from the mold cavity; locating the sensing coil within the mold cavity and spacing the front face of the sensing coil a distance from a front wall of the mold cavity with at least one slideable locator; retracting the slideable locator from the mold cavity; injecting the self-bonding moldable material into the cavity of the mold to precisely ensconce the sleeved coil and cable assembly and providing a precise face thickness covering the face of the coil; retracting the slideable supports from the sleeved coil and cable assembly so that the self-bonding moldable material will flow into the areas heretofore occupied by the slideable supports; allowing the moldable material to set; and removing the thus formed transducer from the mold cavity as an integrated unit having a seamless mass of moldable material ensconcing the sleeved coil and cable assembly.

These and other objects will be made manifest when considering the following detailed specification when taken in conjunction with the appended drawing figures.

BRIEF DESCRIPTION OF THE DRAWINGS

FIG. 6 is a diagrammatic view of an assembly step of the present invention and a cross-sectional view of the combination of the elements of FIG. 4.

FIG. 7 is a diagrammatic view of an assembly step of the present invention and a partial sectional view of the combination of the elements of FIG. 6.

FIG. 8 is a partial sectional view of the combination of the elements of FIG. 7.

DESCRIPTION OF PREFERRED EMBODIMENTS

Figure 1:
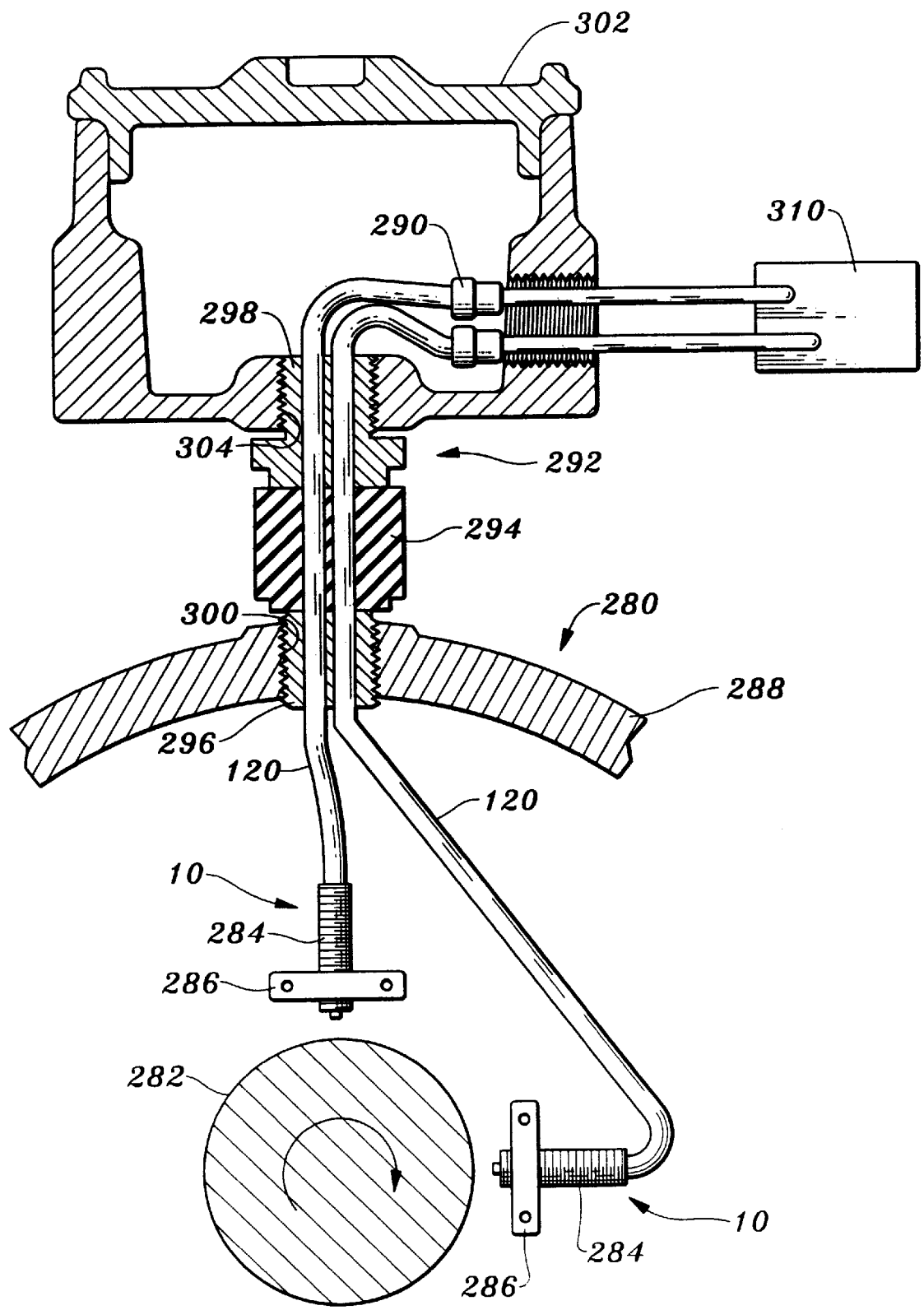
FIG. 1 is an elevational view of an encapsulated transducer with a component alignment preform according to the present invention which is juxtaposed to a rotating shaft of a machine for monitoring the vibration thereof.

Considering the drawings, wherein like reference numerals denote like parts throughout the various drawing figures, reference numeral 10 is directed to the encapsulated transducer with a component alignment preform according to the present invention.

Figure 2:
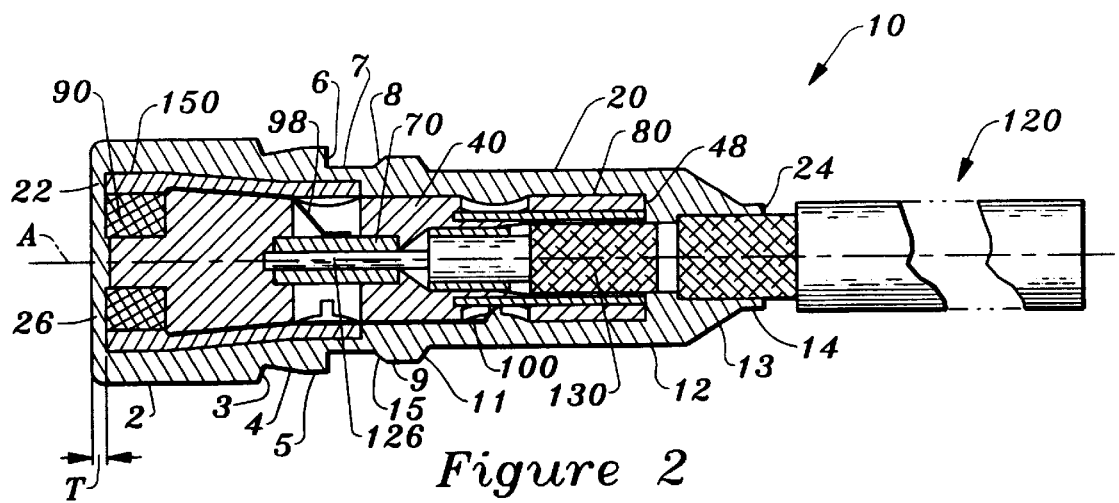
FIG. 2 is a partial sectional view of the encapsulated transducer with the component alignment preform according to the present invention.

In essence, and referring to FIG. 2, the encapsulated transducer 10 includes an injection molded encapsulation 20 having a front end 22 and a back end 24. The encapsulation 20 is a monolith of cured moldable material ensconcing a sensing element 90 proximate the front end 22 and a portion of an information transmitting medium 120 emanating from the back end 24. A component alignment preform 40 operatively couples the sensing element 90 with the information transmitting medium or cable 120. The component alignment preform 40 includes a front ferrule 70 and a rear ferrule 80 bonded thereto and linearly spaced apart along a long axis "A" of the transducer 10. The component alignment preform 40 further includes an annular recess 44 (FIG. 3) in which the sensing element or coil 90 is placed so that it is linearly spaced and aligned along the common long axis "A" in which the front and rear ferrules 70, 80 are aligned. A first lead 98 of the coil is electrically connected to the front ferrule 70 and a second lead 100 of the coil 90 is electrically connected to the rear ferrule 80. A back end 48 of the component alignment preform 40 receives a stripped end 122 (FIG. 6) of the cable 120 such that a center conductor 126 mates with the front ferrule 70 and a coaxial conductor 130 mates with the rear ferrule 80. The respective conductors 126, 130 are electrically and mechanically connected to the pair of front and rear ferrules 70, 80. A protective "abbreviated" sleeve 150 (i.e. extending only from the coil 90 to the front ferrule 70) is then fitted over the coil 90 thereby forming a sleeved coil and cable assembly 170 (FIG. 8). This sleeved coil and cable assembly 170 is encapsulated by an injection molding process which provides the durable encapsulation 20 which bonds with itself and with the sleeved coil and cable assembly 170. The sleeved coil and cable assembly 170 is symmetrically disposed within the encapsulation 20 and the encapsulation 20 includes an integrally formed protective wall 26 having an uniform thickness "T" along a forwardmost portion of the sensing element 90.

A leading portion of the transducer skin is cylindrical 2 near the coil 90 and has a front wall 26 sealing the coil. Thereafter, the skin steps down 3, then diverges outwardly 4 and transitions to a cylindrical section 5. Another instep 6 leads to a cylindrical section 7, thence to a ridge 9 flanked by an up slope 15 and a down slope 11, followed by a long cylinder 12, terminating in an intaper 13, a cylindrical section 14 and the back end 24 which grasps the cable 120 tightly.

Figure 3:
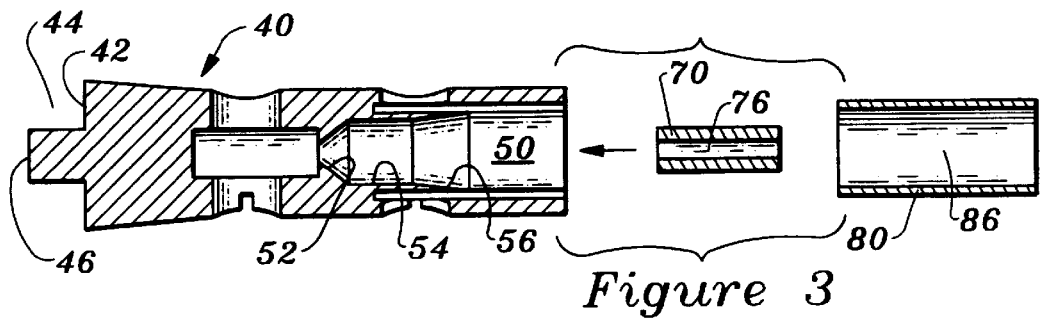
FIG. 3 is a cross-sectional exploded parts view of the component alignment preform.
Figure 4:
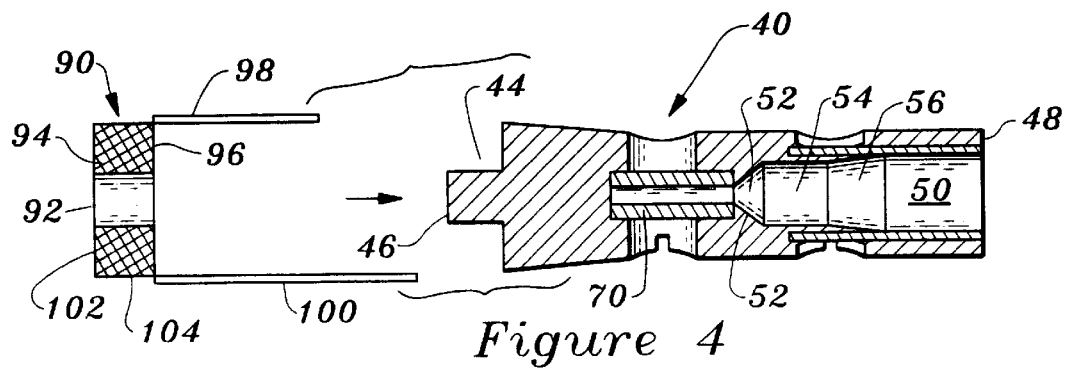
FIG. 4 is a cross-sectional view of a sensing coil and the component alignment preform formed by the combination of the elements of FIG. 3.

More specifically, and referring to FIGS. 3 and 4, the component alignment preform 40 is formed in a first injection molding process where the moldable material is preferably polyphenylene sulfide (PPS). The PPS material is a dielectric and thus an electrical insulating material which has the characteristic of bonding to itself. The front and rear ferrules 70, 80 are preferably placed on a pin support within a mold and the PPS material is molded around the front and rear ferrules 70, 80 thereby forming the component alignment preform 40 as shown in FIG. 4. The front and rear ferrules 70, 80 are inner-locked and linearly spaced apart along the long axis "A" by the PPS material. A front end 42 of the preform 40 includes an annular recess 44 having a center post 46 axially aligned with the front and rear ferrules 70, 80 along the long axis "A". The preform 40 further comprises a chamber 50 including a bridging section 54 of constant cross-sectional area extending between a front and a rear truncated cone 52, 56 which isolate the front and rear ferrules 70, 80. The front ferrule 70 includes a bore 76 with an inner diameter substantially equal to the outer diameter of the center conductor 126. The rear ferrule 80 includes a bore 86 with an inner diameter substantially equal to the outer diameter of the coaxial conductor 130. The ferrules 70, 80 are preferably formed from brass.

Figure 5:
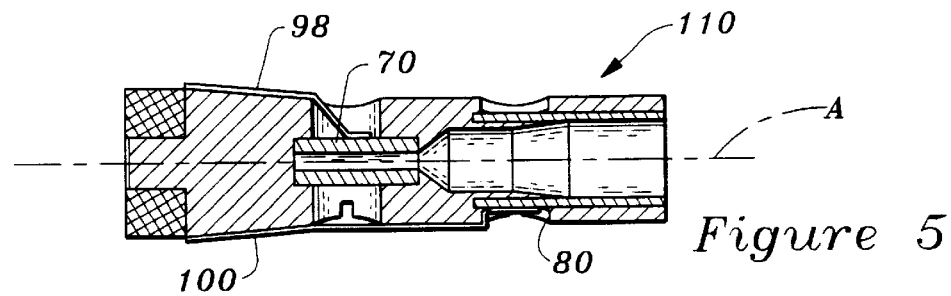
FIG. 5 is a cross-sectional view of the combination of the elements of FIG. 4.

Referring to FIGS. 4 and 5, the sensing element 90 is preferably a sensing coil 90 comprised of a front face 94, a back face 96, a body 102 having an outer surface 104 and a center void 92 extending through the body 102 and first and second leads 98, 100 extending from the coil 90 and spaced from one another. The body 102 of the coil 90 extends between the front face 94 and the back face 96.

Once the component alignment preform 40 has been formed, the sensing coil 90 may be electrically connected to the respective ferrules 70, 80 of the preform 40. This is accomplished by placing the sensing coil 90 within the annular recess 44 of the preform 40 such that the post 46 extends a distance within the center void 92 of the coil 90. The first lead 98 is then preferably induction welded to the front ferrule 70 and the second lead 100 is preferably induction welded to the rear ferrule 80, thus forming a coil and preform assembly 110. Next, the cable 120 is electrically and mechanically connected within the preform 40.

Referring to FIGS. 6 through 8, the cable 120 is preferably a triaxial cable comprised of an outer jacket 136 circumscribing an interior of the cable which includes three concentrically disposed conductors 126, 130 and 134 separated from one another by at least two concentrically disposed dielectrics or insulators 128, 132. More specifically, the outer protective jacket 136 circumscribes the concentrically disposed triaxial, coaxial and center conductors 134, 130 and 126 which are separated from one another by an insulator 132 and a dielectric 128 interposed between the triaxial and coaxial conductors 134, 130 and the coaxial and center conductors 130, 126, respectively. At least one end 122 of the cable 120 is stripped in a step-like fashion to expose a length of the center conductor 126, the dielectric 128, the coaxial or outer conductor 130, the insulator 132 and the triaxial conductor 134.

Referring to FIG. 6, solder paste 140 is inserted into the bore 76 of the front ferrule 70 preferably, via a syringe which is pneumatically driven so as to dispense an uniform predetermined amount of paste 140 which is reproducible every time. A solder ring 142 is placed onto the stripped end 122 of the cable 120. The solder ring 142 encircles the coaxial conductor 130 and abuts the insulator 132 which is interposed between the coaxial and triaxial conductors 130, 134. An elastomeric sleeve 144 is placed over the dielectric 128 of the cable 120 and includes an inner diameter which substantially matches the outer diameter of the dielectric 128. The elastomeric sleeve 144 may be of an insulating material such as fluorosilicone rubber. The elastomeric sleeve 144 has an outer diameter which is slightly larger than the bridging section 54. The cable 120 is then inserted into the back end 48 of the component alignment preform 40 such that the center conductor 126 fits within the bore 76 of the front ferrule 70 and the coaxial conductor fits within the bore 86 of the rear ferrule 80. An axial force exerted as shown by the arrows $F_1$ and $F_2$, deform the elastomeric sleeve 144 against the conical transition between the bridging section 54 and the rear truncated cone 56. This provides a tight seal between this transition area and the dielectric 128 of the cable 120 as shown in FIG. 7. A permanent mechanical and electrical connection is made between the coaxial conductor 130 and the bore 86 of the rear ferrule 80 and also between the center conductor 126 and the bore 76 of the front ferrule 70. The use of inductive heating, with the above forces $F_1$, $F_2$ being applied, causes the solder paste 140 and solder ring 142 to melt and flow over the exposed conductors 126, 130 and upon cooling fixes the exposed conductors 126, 130 permanently throughout their length to the bores 76, 86 of the front ferrule 70 and the rear ferrule 80 respectively. Of course, rather than solder, an adhesive or welding may be used. Note that the preformed amount of solder paste 140 and the preformed solder ring 142 provide effective repeatability of the electromagnetic characteristics of the entire encapsulated transducer 10, especially with respect to the inductance parameter of the sensing coil 90 which as illustrated is relatively close to the center conductor 126.

Referring to FIG. 7, a protective sleeve 150 is preferably formed from the PPS material. The protective sleeve includes a first end 152 with a substantially constant cross-sectional area and a second end 154 with a substantially constant cross-sectional area larger than the cross-sectional area of the first end 152. A body 156 extends from the first end 152 to the second end 154. The body includes a first longitudinal length 158 proximate the first end 152 having a cross-sectional area substantially equal to the cross-sectional area of the first end 152, a second longitudinal length 160 proximate the second end 154 having a cross-sectional area substantially equal to the cross-sectional area of the second end 154 and a sloped length 162 diverging outwardly from a central axis "B" of the sleeve 150 as the sloped length 162 transitions from the first longitudinal length 158 to the second longitudinal length 160. The body 156 has a substantially smooth outer surface 166 and a hollow inner bore defining a substantially smooth inner surface 164. The substantially smooth outer surface 166 of the sleeve 150 precludes seams or interruption to be formed in the encapsulation 20 thus, eliminating areas which are susceptible to, inter alia, predations of the environment. The protective sleeve 150 is fitted onto the coil and cable assembly 112 by placing it over an end opposite the stripped end 122 and moving it into engagement with the coil 90. The second end 154 of the sleeve 150 is placed flush with the front face 94 of the coil 90. An inner surface 162 of the protective sleeve 150 may be provided with an adhesive at one or more points so that it may adhere to the preform 40. The preform has a taper 41 adjacent the coil to underlie the slope 162 in corresponding tight engagement. End 154 of sleeve 150 snugly overlies annular surface 104 of coil 90. The constant cross-section near end 152 overlies a groove 39 in the preform 40 to assure the preform is located properly by "snapping" into place because of groove 39. Once the sleeved coil and cable assembly 170 (FIG. 8) is formed, it is reader to be encapsulated.

Figure 9:
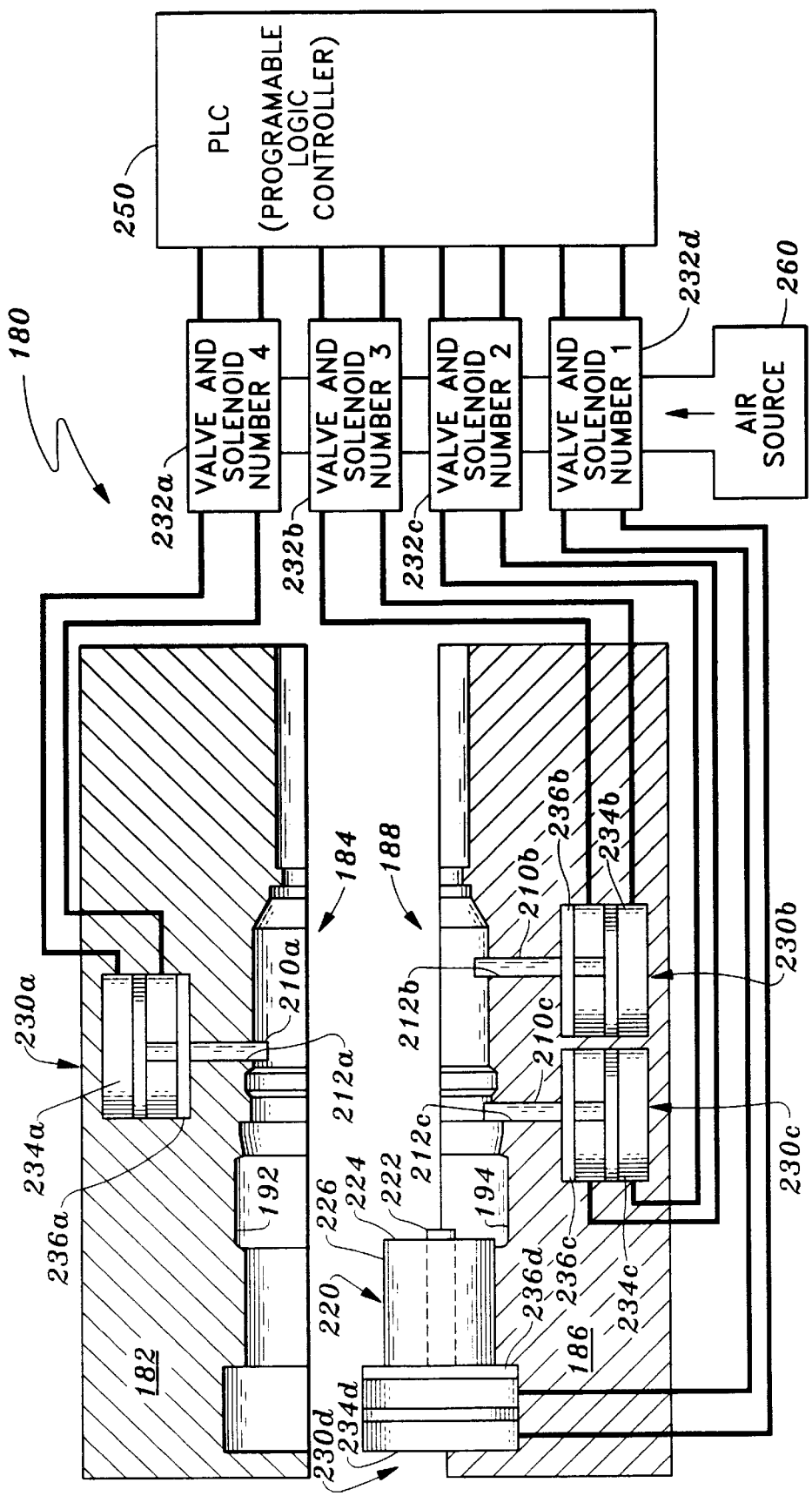
FIG. 9 is a simplified cross-sectional view of a mold in an open position and having all included slideable support and locator pins in an extended position.
Figure 11:
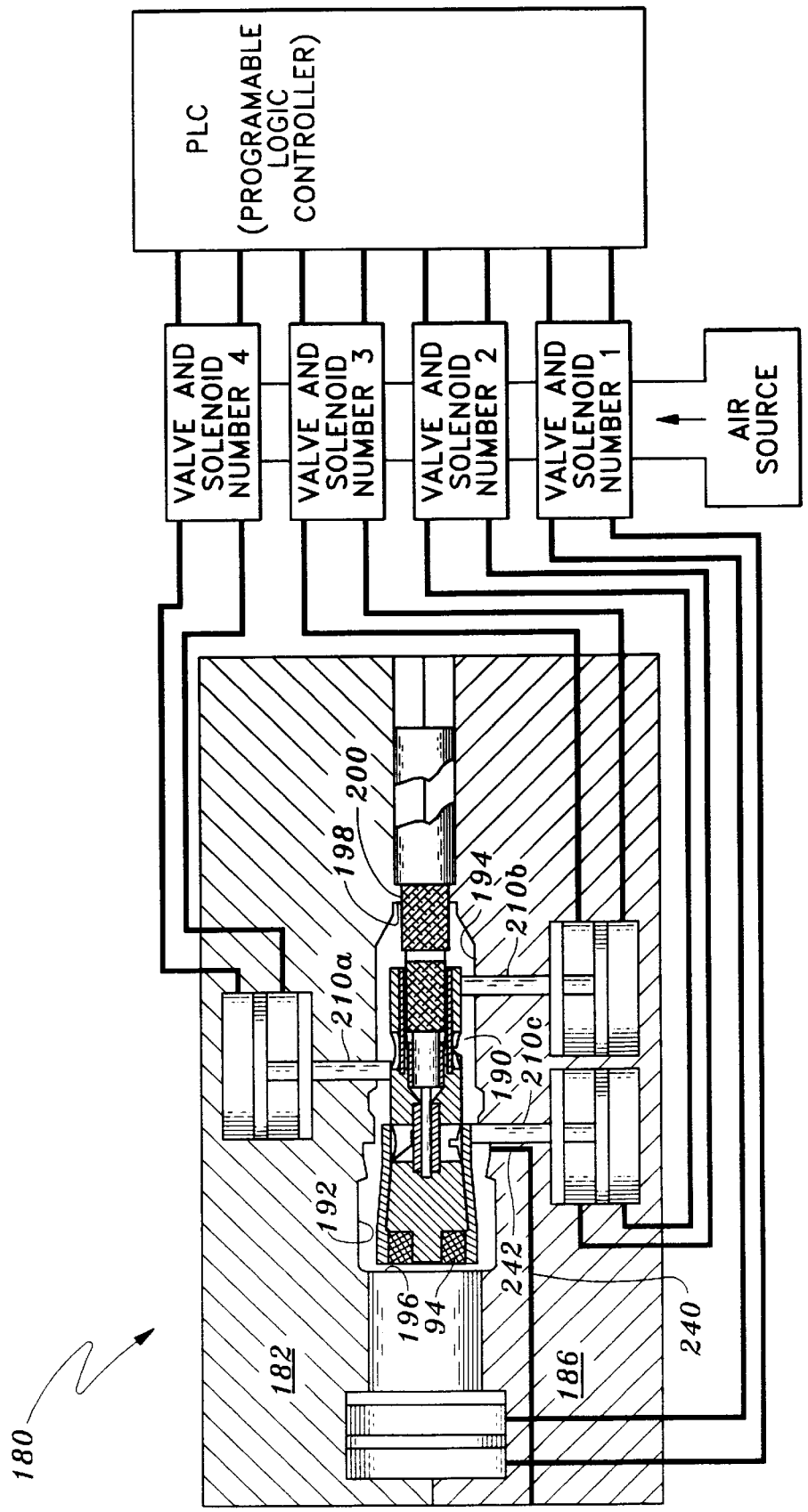
FIG. 11 is a simplified cross-sectional view of the mold in a closed position with the slideable locator pin retracted from engagement of the sensing coil.

Referring to FIGS. 9 and 11, an injection mold 180 is defined by an upper mold plate 182 having an upper cavity 184 and a lower mold plate 186 having a lower cavity 188 forming a single mold cavity 190 when in the closed position. The mold cavity 190 is shaped complementary to the desired form of the encapsulation 20 of the sleeved coil and cable assembly 170. The mold cavity 190 is defined by an upper wall 192, a lower wall 194, a front wall 196 and a back wall 198 having an opening 200 extending therethrough.

The upper mold plate 182 is provided with at least one sleeve 212a through which at least one slideable support pin 210a may be moved into or out of the upper cavity 184 by a drive means 230a. The lower mold plate 186 is preferably provided with a pair of sleeves 212b, 212c through which a pair of slideable support pins 210b, 210c may be moved into or out of the lower cavity 188 by corresponding drive means 230b and 230c. In addition, the injection mold 180 is provided with a slideable locator pin 220 which is preferably disposed on the lower mold plate 186 at a location adjacent the front wall 196 of the mold cavity 190. The slideable locator pin 220 preferably includes a pair of concentrically disposed slideable pins 222, 224 in which an inner pin 222 slides within an outer pin 224 which in turn slides within a sleeve 226. Both the inner pin 222 and the outer pin 224 may be moved by an associated drive means 230d such that they are capable of extending into or out of the lower cavity 188 when the mold 180 is in the opened position. Preferably, the inner pin 222 is capable of extending further into the lower cavity 188 than the outer pin 224.

Alternatively, the slideable locator pin 220 may be fixed which would be tantamount to an integrally formed T-shaped pin having a top branch resembling the outer pin 224 and a base branch resembling the inner pin 222 in an extended and rigidly fixed position with respect to the top branch.

The slideable support pins 210a–210c and the slideable locator pin 220 are each preferably provided with separate drive means, 230a–230d respectively and may be independently controlled by a programmable logic controller (PLC) 250 or the like.

Each drive means 230a–230d includes a valve and solenoid unit 232a–232d, a pneumatic cylinder 234a–234d and an ejector plate 236a–236d. Each ejector plate 236a–236c is connected to each respective support pin 210a–210c and ejector plate 236d is connected to locator pin 220. Each ejector plate 236a–236d is received within the corresponding pneumatic cylinder 234a–234d which in turn is connected to the corresponding valve and solenoid unit 232a–232d. Each valve and solenoid unit 232a–232d is electrically connected to the PLC 250 and mechanically connected to a gas source 260. The PLC 250 independently sends out an electrical signal to each solenoid of each valve and solenoid unit 232a–232d. Each solenoid receives the signal and physically opens and closes the corresponding valve. This allows gas to be sent to each respective pneumatic cylinder 234a–234d and depending on the location of each ejector plate 236a–236d will cause each support pin 210a–210c and locator pin 220 to extend into or retract out of the mold cavity 190. The ejector plate 236d may be coupled to the inner pin 222 such that the inner pin 222 extends or retracts a short distance and then catches the outer pin 224 and causes it to correspondingly extend or retract.

When the injection mold 180 is in the closed position preferably only the support pins 210a–210c are used to support and symmetrically locate the sleeved coil and cable assembly 170 within the mold cavity 190 (FIG. 11). Depending upon the specific assembly 170 configuration and the way molten moldable material is filling around the assembly 170, one of the support pins may be retracted sooner than another. Retracting the support pins is sequenced with the timing in the PLC 250 and may be calibrated until all of the support pins 210a–210c retract in a manner which allows the assembly 170 to remain centered both radially and axially within the mold cavity 190. Note that if the retraction of the support pins 210a–210c is not sequenced correctly the assembly 170 may shift to one side or the other in the mold cavity 190. This may cause an alteration of the electrical characteristics of the encapsulated transducer 10.

Figure 10:
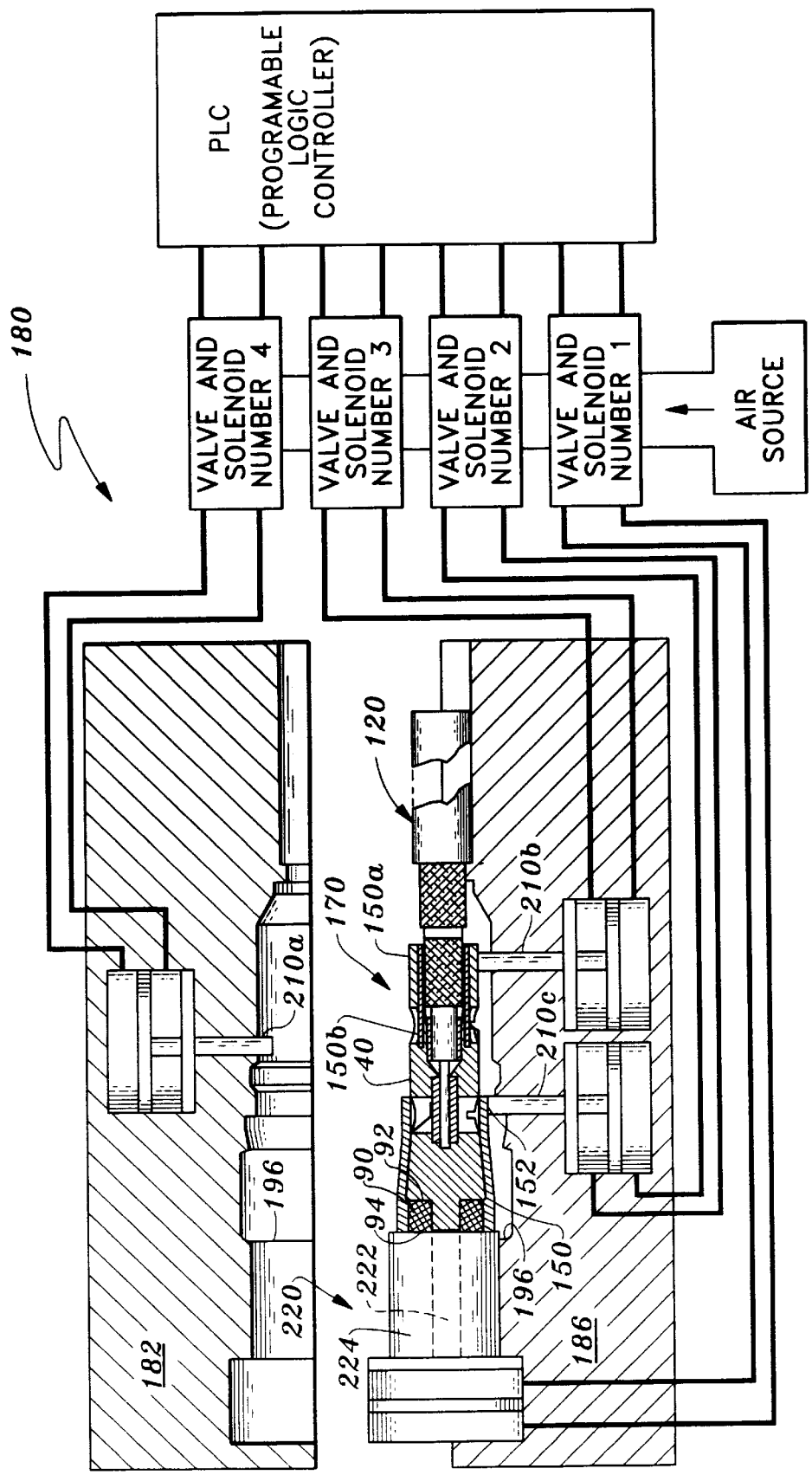
FIG. 10 is a view of the mold of FIG. 9 with the slideable support pins centering and supporting that which is shown in FIG. 8.

Referring to FIG. 10, the coil and cable assembly 170 is radially and axially centered by way of the extended support pins 210b, 210c and an extended locator pin 220. The locator pin 220 centers the coil 90 and spaces it a predetermined distance from the front wall 196 of the mold cavity 190 by way of the inner pin 222 being partially received within the void 92 of the coil 90 and the outer pin 224 abutting against a front face 94 of the coil 90. In addition, support pin 210c is extended into the lower cavity 188 and placed in engagement with an end 152 of sleeve 150, now part of the preform 40 for providing support thereto. Support pin 210b also extends into the lower cavity 188 and abuts a cylindrical portion 40a of the protective preform 40 adjacent an end near cable 120. In addition, a slot such as groove 150b may be provided on preform 40 to locate the engagement of the support pins 210b, 210c with the preform 40 and the protective sleeve 150 respectively. Sleeve 150 could have a locating aperture 150c to help locate pin 210c in groove 39 (FIG. 8). Once the sleeved coil and cable assembly 170 has been centered within the lower cavity 188, the locator pin 220 is withdrawn and the mold cavity 190 is placed in a closed position (FIG. 11). At this time, the front face 94 of the coil 90 is precisely spaced from the front wall 196 of the mold cavity 190. This allows the encapsulation 20 of the encapsulated traducers 10 to include the integrally formed protective wall 26 having a substantially uniform thickness "T" (FIG. 2) and thus, a predetermined linear range. This is particularly important when manufacturing a plurality of encapsulated transducers 10 which are to have uniform electrical characteristics. Furthermore, once the mold 180 is closed the cable 120 extends out of the opening 200 in the back wall 198 of the mold cavity 190. The engagement of the upper mold plate 182 and the lower mold plate 186 provides additional support by having the cable 120 cantilevered therebetween. Support pin 210a extends into the upper cavity 184 from the upper mold plate 182 and comes into engagement with the preform 40 of the cable 170 thereby providing a top support to the sleeved coil and cable assembly 170. A void completely surrounds the sleeved coil and cable assembly 170 except of course where the pins 210a–210c are abutting the assembly 170. An alternative embodiment to FIG. 11 may use fewer or more support pins 210a–210c for centering and supporting the sleeved coil and cable assembly 170 in the mold cavity 190.

The moldable material is injected into the mold cavity via runners 240 (FIG. 11) and gates 242 provided in the lower mold plate 182 and/or the upper mold plate 186. It is preferred that a gate 242 be provided adjacent each support pin 210a–210c. Preferably, the moldable material is polyphenylene sulfide (PPS) which has the characteristic of bonding to itself. The injection of the moldable material is continued until the mold cavity 190 is completely filled. Once the mold cavity 190 is filled, the support pins 210a–210c are sequentially or simultaneously retracted such that the sleeved coil and cable assembly 170 remains centered within the mold cavity 190. Note that an additional charge of moldable material may be introduced into the mold cavity 190 simultaneously with the retractions of the support pins 210a–210c such that the sleeved coil and cable assembly 170 is completely ensconced within the moldable material and all voids have been filled.

Figure 12:
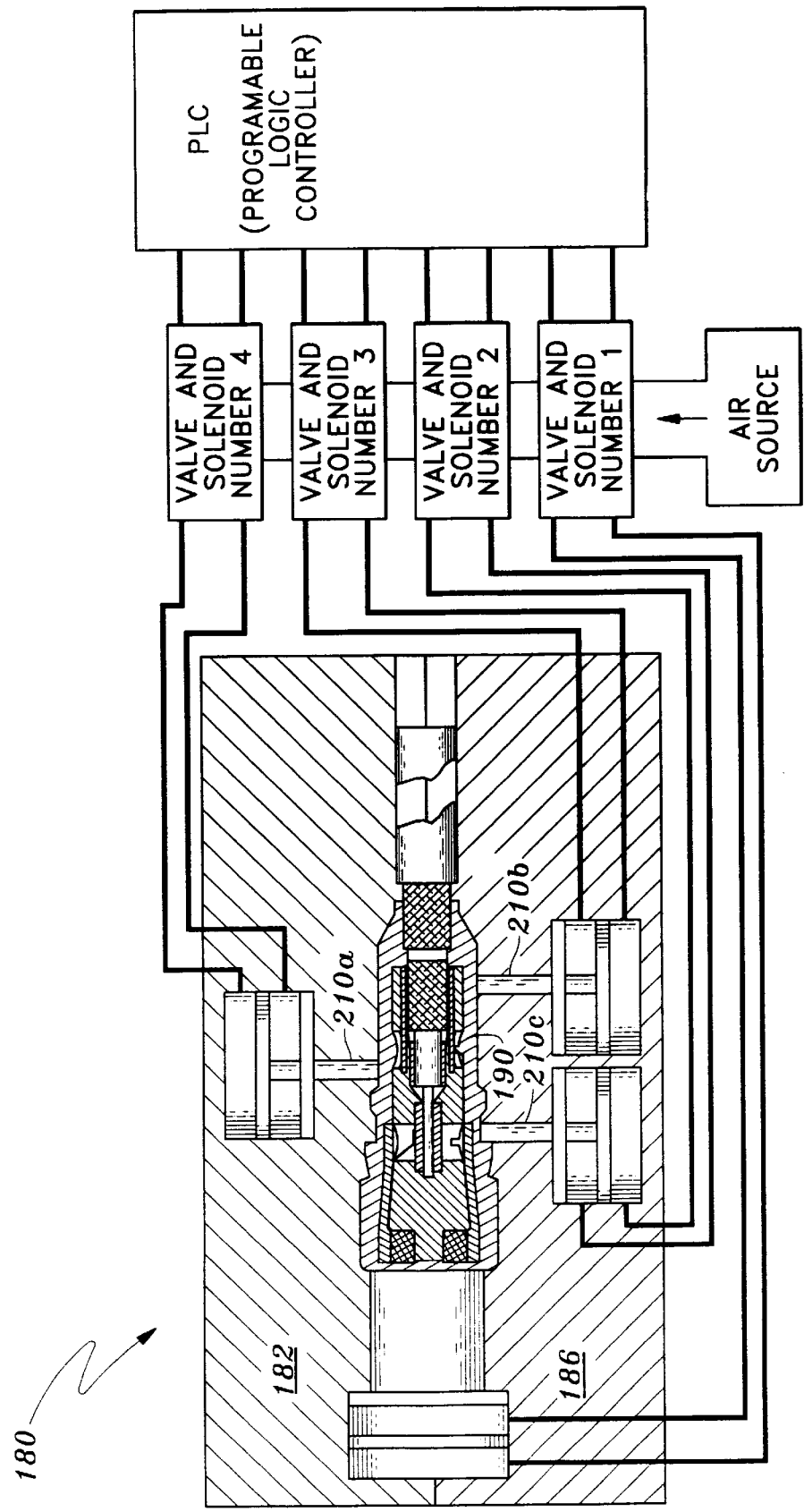
FIG. 12 is a simplified cross-sectional view of the mold in a closed position with the slideable support pins retracted after an injection molding according to the present invention is completed.

Referring to FIG. 12, once the process of injecting the moldable material into the mold cavity 190 is completed and the support pins 210a–210b have been retracted, the mold 180 may be opened and the encapsulated transducer 10 allowed to cool in the lower mold plate 186. Once the encapsulated transducer is cooled one or more of the bottom support pins, 210b, 210c may be actuated to eject the encapsulated transducer 10 therefrom.

Figure 13:
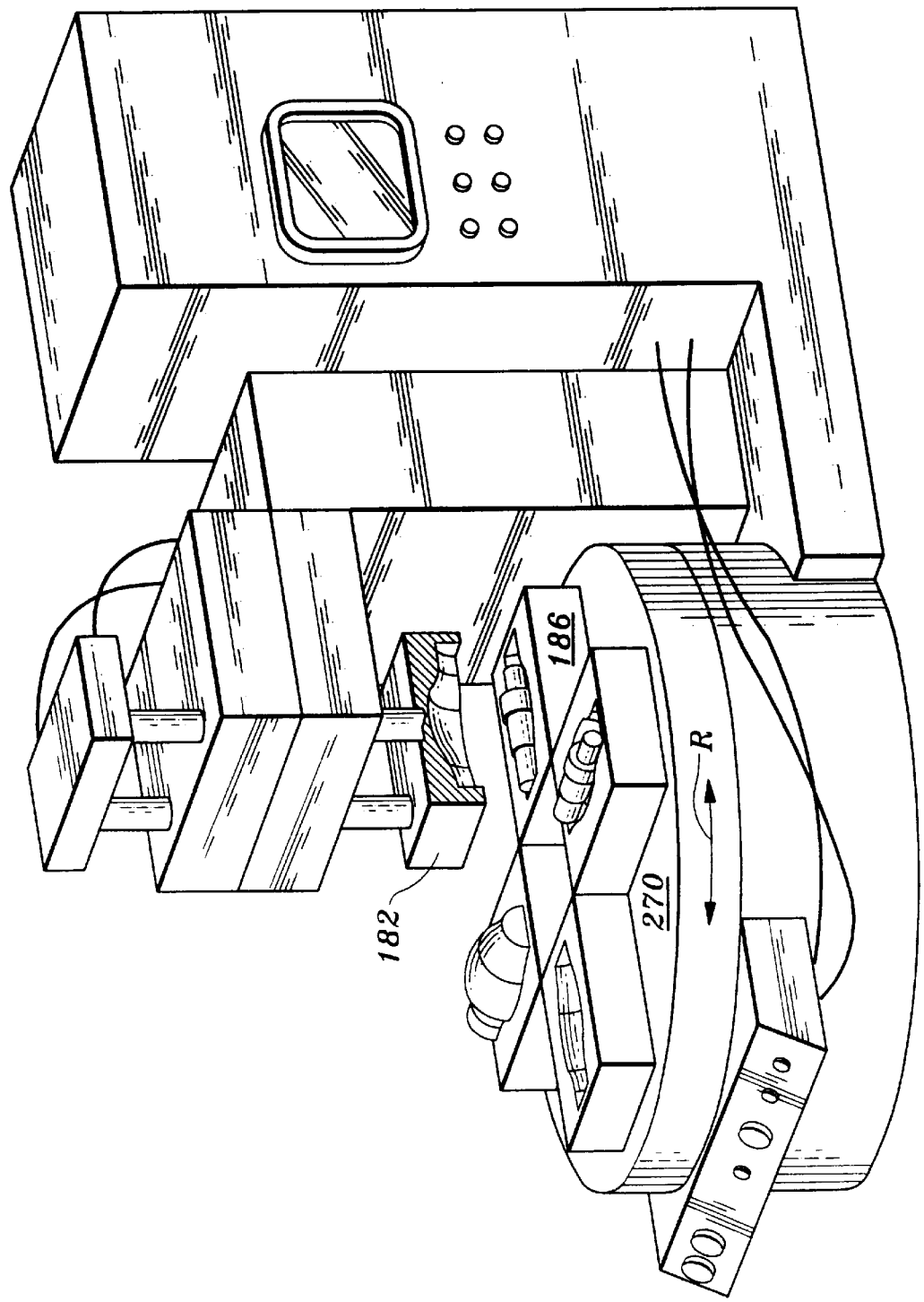
FIG. 13 is an elevational view of an injection mold used to mass produce a plurality of encapsulated transducers sequentially.

In mass production it is preferred that an injection molding device be provided which includes a single upper mold plate 132 and a plurality of lower mold plates 186 disposed on a rotatable table 270 (FIG. 13). The lower mold plates 186 may each be preloaded with a single sleeved coil and cable assembly 170. Then, the upper mold plate 182 comes down onto the first inline lower mold plate 186 and the respective sleeved coil and cable assembly 170 is encapsulated. Once the encapsulation process is completed the upper mold plate 182 is lifted and the table 270 is rotated about arrow "R" to align a subsequent lower mold plate 186 with the stationary upper mold plate 182 so that the encapsulation process may be repeated.

Meanwhile, the previously encapsulated transducer 10 may remain within the lower mold plate 186 and be allowed to cool as the table is rotated and then ejected as delineated above. Now, after the encapsulated transducer 10 is ejected the lower mold plate 186 is reloaded with a sleeved coil and cable assembly 170 and extends back to the upper mold plate 182 as the table 270 is rotated. This process may continue for encapsulating a batch of sleeved coil and cable assemblies 170.

In use and operation, and referring to FIGS. 1 and 2, the encapsulated transducer 10 may, for example, be utilized as a proximity transducer for monitoring the vibrational characteristics of a rotating shaft 282 of a machine 280. In this environment the encapsulated transducer 10 operates on the eddy current principle and outputs a signal correlative to the spacing between the rotating shaft 282 and the sensing coil 90 of the encapsulated transducer 10.

Typically, the encapsulated transducer 10 is circumscribed by a threaded metal case 284 which is mounted adjacent the rotating shaft of the machine 280. A mounting means 286 is used to strategically mount the encapsulated transducer 10 such that the sensing coil 90, proximate the front end 22 of the encapsulation 26, and the rotating shaft 282 are in a juxtaposed relation. The sensing coil 90 is electrically and mechanically connected to the cable 120. The cable 120 extends out the back end 24 of the encapsulation 20 and runs through a casing 288 of the machine 280 where it preferably terminates to a connection 290 capable of directly coupling to an electrical processing unit 310 or to an extension cable which in turn couples to the electrically processing unit 310.

Preferably, the cable 120 is routed through the machine case 288 by passing through a rubber grommet 294 internal to an adaptor 292 operatively coupled to the machine case 288. The adaptor 292 includes a first end 296 having external and internal threads. The external threads of the adaptor are coupled with a threaded bore 300 in the machine case 288 for firmly connecting the adaptor 292 thereto. In some instances, the internal threads of the first end 296 of the adaptor 292 allow the mounting of the encapsulated transducer 10 via the threaded metal case 284. A second end 298 of the adaptor 292 having external threads may be coupled to a threaded aperture 304 in a junction box 302 such that the junction box 302 is mounted to the machine case 288. The junction box 302 allows any electrical connections operatively coupling the cable 120 to the electrical processing unit 310 to be enclosed in a weather-proof or explosion-proof environment.

In addition to use as a proximity transducer, the present invention may be employed very broadly in the monitoring and diagnostic field. One example is as a temperature transducer which would use a coil formed from a single wire thermocouple of the RTD type. The coil would be molded within the encapsulation 20 and the only change in the above delineated process may be in the use of perhaps a thinner overall encapsulation. This would provide for a suitable heat transfer to the RTD temperature sensing coil.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An information transmitting sensor and housing comprising:

a sensing element;

a cable coupled to said sensing element;

a component alignment preform operatively coupled to said sensing element and said cable;

a protective sleeve including a body having a substantially smooth outer surface and extending from said sensing element over said preform and towards said cable; and a monolith of cured moldable material ensconcing said sensing element and extending seamlessly along said substantially smooth outer surface of said sleeve and ensconcing a portion of said cable defining a seamless mass circumscribing said sensing element and a portion of said cable.

2. The sensor of claim 1 further comprising said component alignment preform disposed within said monolith of cured moldable material, said preform including a front end having an annular recess and a center post, a back end having an opening and a medial portion interposed between said front end and said rear end of said preform, said medial portion having a chamber in open communication with the opening in said back end.

3. The sensor of claim 2 wherein said component alignment preform includes a front ferrule and a rear ferrule bonded thereto and linearly spaced apart by said chamber along a long axis of said sensor and in open communication with said chamber.

4. The sensor of claim 3 wherein a front passage and a rear passage within said component alignment preform are in open communication with said front and rear ferrules respectively.

5. The sensor of claim 4 wherein said sensing element is a coil having a front face, a back face and a body having an outer surface and a center void extending therethrough, said body extending between said front face and said back face.

6. The sensor of claim 5 wherein said coil is disposed within said annular recess of said preform and receives said center post within the center void of said coil thereby axially aligning said coil with said front and rear ferrules along the long axis of said sensor.

7. The sensor of claim 6 wherein said first lead extends into the front passage of said preform and is electrically connected to said front ferrule.

8. The sensor of claim 7 wherein said second lead extends into the rear passage of said preform and is electrically connected to said rear ferrule.

9. The sensor of claim 8 wherein said cable includes at least a center conductor and a coaxial conductor separated from one another by at least one dielectric.

10. The sensor of claim 9 wherein at least one end of said cable is stripped in a step-like fashion to expose a length of at least said center conductor, dielectric and coaxial conductor.

11. The sensor of claim 10 wherein said stripped end of said cable passes through the opening in said back end of said perform and said center conductor is electrically and mechanically connected within a bore of said front ferrule and said coaxial conductor is electrically and mechanically connected within a bore of said rear ferrule.

12. The sensor of claim 11 including a seal circumscribing said dielectric at the stripped end of said cable and wedged between said dielectric and said chamber of said preform thereby providing a barrier therebetween.

13. The sensor of claim 12 wherein said protective sleeve includes a first end with a substantially constant cross-sectional area and a second end with a substantially constant cross-sectional area greater than the first end and said body having said substantially smooth outer surface and a hollow inner bore defining a substantially smooth inner surface, said body extending between said first end and said second end.

14. The sensor of claim 13 wherein said body of said sleeve includes a first longitudinal length proximate said first end having a cross-sectional area substantially equal to the cross-sectional area of said first end and a second longitudinal length proximate said second end having a cross-sectional area substantially equal to the cross-sectional area of said second end and a sloped length diverging outwardly from a central axis of said sleeve as said sloped length transitions from said first longitudinal length to said second longitudinal length.

15. The sensor of claim 14 wherein said sleeve fits over said coil and is attached to said preform such that said second end of said sleeve is substantially flush with said first face of said coil and said body of said sleeve extends beyond said back face of said coil.

16. The sensor of claim 15 wherein said component alignment preform and said sleeve are formed from said moldable material.

17. The sensor of claim 16 wherein said monolith of cured moldable material bonds with said preform and said sleeve.

18. The sensor of claim 17 wherein said monolith of cured moldable material contacts and contours to the front face of said coil and uniformly extends therefrom to form a substantially uniform thick wall substantially parallel with said front face of said coil.

19. The sensor of claim 18 wherein said monolith of cured moldable material ensconces a length of said cable proximate the back end of said preform where the cable emanates therefrom.

20. A transducer for monitoring the status of rotating equipment wherein a shaft of the rotating equipment is exposed to said transducer, comprising, in combination:

means for mounting said transducer a distance from the shaft such that a tangent of the shaft is perpendicular to a long axis of said transducer, said transducer having a sensing coil located proximate the shaft, a front portion of said transducer including a protective wall having uniform thickness along a forwardmost portion of said sensing coil, said sensing coil symmetrically disposed about the long axis, and a protective seamless encapsulation integrally formed with said protective front wall ensconcing said sensing coil and overlapping and extending seamlessly along a substantially smooth outer surface of a preform sleeve and overlapping a leading portion of a cable operatively coupled to said sensing coil, said cable extending away from said transducer to an electrical processing unit.

21. An information transmitting sensor, comprising, in combination:

means for mounting said sensor a distance from a shaft such that a tangent of the shaft is perpendicular to a long axis of said sensor, said sensor having a sensing coil located proximate the shaft, a front portion of said sensor including a protective wall having uniform thickness along a forwardmost portion of said sensing coil, said sensing coil symmetrically disposed about the long axis, and a protective sleeve including a body having a substantially smooth outer surface, said protective sleeve extending away from said protective wall and covering said sensing coil;

a protective seamless encapsulation integrally formed with said protective front wall ensconcing said sensing coil and overlapping and extending seamlessly along said substantially smooth outer surface of said protective sleeve and overlapping a leading portion of a cable operatively coupled to said sensing coil, said cable extending away from said transducer to an electrical processing unit.

* * * * *